Patented Oct. 21, 1952

2,615,021

UNITED STATES PATENT OFFICE 2,615,021

ANTHRAQUINONE DYESTUFF FOR WOOL

David I. Randall, Easton, Pa., and Edgar E. Renfrew, Phillipsburg, N. J., assignors to General Aniline & Film Corporation, New York, N. Y., a corporation of Delaware No Drawing. Application November 17, 1950, Serial No. 196,350

5 Claims. (Cl. 260—272)

1

This invention relates to new and valuable compounds which are useful as dyestuffs for wool and which have a bright greenish-blue shade.

The new compounds have the following general formula,

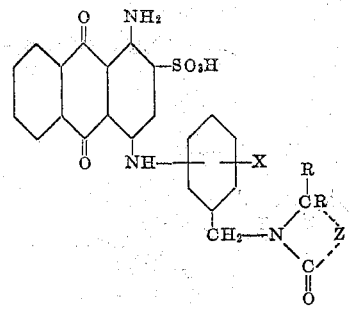

wherein R is selected from the group consisting of hydrogen and a lower alkyl group and X is selected from the class consisting of hydrogen, halogen, hydroxy, lower alkyl, lower alkoxy, carboxylic and sulfonic acid groups and wherein Z represents an alkylene radical necessary to complete a lactam ring. It will be understood that the hydrogen of the sulfonic acid group in the above formula may be replaced by sodium or other metal.

These dyestuffs are generally prepared by the reaction of bromamine acid with suitable amines.

The amines are preferably prepared in accordance with copending application, Serial No. 136,166, filed December 30, 1949. In general the amines are prepared by condensing a nitrobenzene compound with a lactam or the like in the presence of formaldehyde, followed by reduction of the condensation product to the corresponding amino derivative.

As representative of the nitrobenzene employed in the condensation reaction the following may be mentioned: m-chloronitrobenzene, o-chloronitrobenzene, p-chloronitrobenzene, p-nitrotoluene, 2,3-dichloro-1-nitrobenzene, 2-chloro-p-nitrotoluene, 3-chloro-p-nitrotoluene, 2,3-dichloro-p-nitrotoluene, 2,5-dichloro-p-nitrotoluene, p-nitro-tert.-amylbenzene, o-nitrotoluene, m-nitrotoluene, 2-nitro-m-xylene, 4-nitro-m-xylene, 4-nitro-o-xylene, 3-nitro-p-xylene, 4-nitro-p-xylene, p-nitroanisole, o-nitroanisole, p-nitrophenetole, o-nitrophenetole, 5-chloro-2-nitroanisole, 2-chloro-4-nitrophenetole, 5-chloro-2-nitrotoluene, 6-chloro-2-nitrotoluene, 6-chloro-3-nitrotoluene, 4,5-dichloro-2-nitrotoluene.

The lactam may be for example one of the following: 2-pyrollidone (γ-butyrolactam), 5-methyl-2-pyrollidone (γ-valerolactam) 2-piperidone (δ-valerolactam), 1-aza-2-cyclooctanone (7-suberolactam) 3-methyl-2-piperidone, 4-methyl-2-piperidone, 3,3-dimethyl-2-piperidone, 3-ethyl-2-piperidin, 6-propyl-2-piperidone, 3-propyl-2-piperidone, 5,5-dimethyl-3-isopropyl-2-pyrrolidone, 1-aza-2-cycloheptanone (2-homopiperidone), 6-methyl-2-piperidone, 5-methyl-2-piperidone, 4-, 5-, 6- and 7-methyl-1-aza-2-cycloheptanone, 4,7,7-trimethyl-1-aza-2-cycloheptanone, 5,7,7-trimethyl-1-aza-2-heptanone, 3,5,5-trimethyl-1-aza-2-heptanone, 4,6,6-trimethyl-1-aza-2-cycloheptanone, 4-isopropyl-7-methyl-1-aza-2-cycloheptanone, 4-methyl-7-isopropyl-1-azo-2-cycloheptanone, 4-isopropyl 5,6-dimethyl-2-piperidone and the like.

The following example illustrates a preferred embodiment of the invention but it will be understood that variations and modifications may be made within the scope of the claims.

Example

In a suitably equipped vessel was charged 30.3 parts by weight sodium 1-amino-4-bromoanthraquinone-2-sulfonate, 20.4 parts 1-(5-amino-2-methylbenzyl)-2-pyrrolidone, 10.6 parts sodium carbonate, 4.2 parts sodium bicarbonate, 1.0 parts cuprous chloride and 800.0 parts water. The mixture was stirred at 80° C. for sixteen hours. Then was added 50.0 parts sodium chloride. The mixture was allowed to cool, whereupon a precipitate settled. It was collected on a filter. The product may be purified by the usual well-known methods. The product after reaction with an acid yielded bright greenish-blue dyeings of excellent properties when dyed on wool. The compound has the formula:

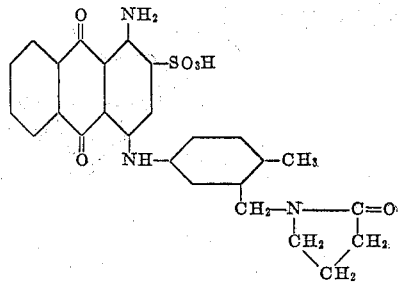

In the same manner as in the above example bromamine acid may be reacted with other N-(aminobenzyl) lactams such as those obtainable by the formaldehyde condensation of the nitrobenzyl compounds and lactams listed above followed by reduction to the corresponding amino derivative. For example, the following compounds may be prepared in this manner:

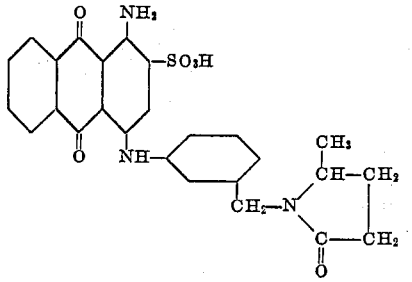

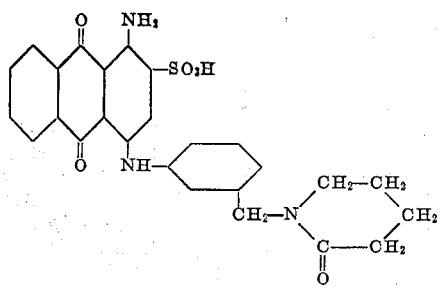

This is a continuation in part of our application Serial No. 132,398 filed December 10, 1949.

What we claim is:

1. A new dyestuff of the general formula,

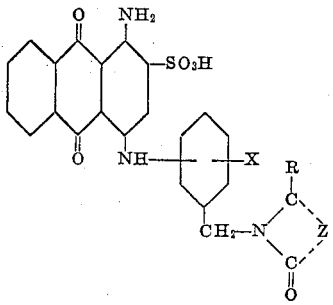

wherein R is selected from the group consisting of hydrogen and a lower alkyl group and $x$ is selected from the class consisting of hydrogen, halogen, hydroxy lower alkyl, lower alkoxy, carboxylic and sulfonic acid groups and wherein Z represents an alkylene radical necessary to complete a lactam ring of not more than six members.

2. A dyestuff of the formula,

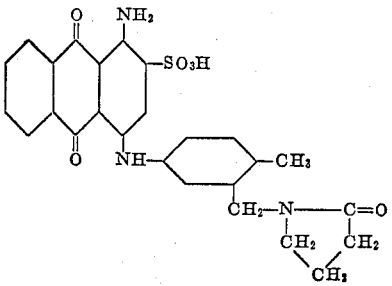

3. A new dyestuff of the formula,

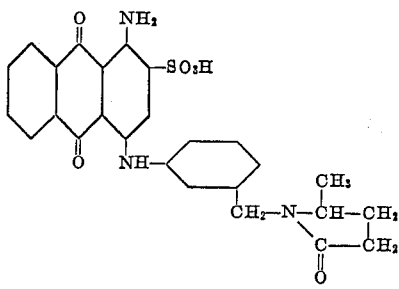

4. A new dyestuff of the formula,

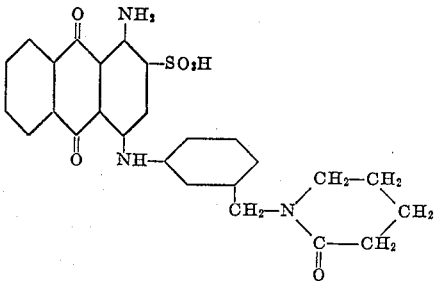

5. A method for preparing a new dyestuff of the formula,

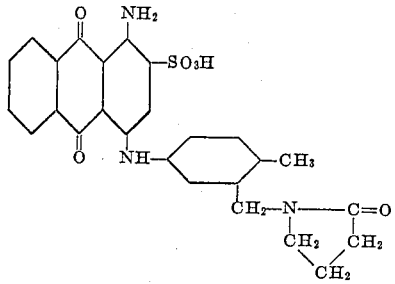

which comprises reacting sodium 1-amino-4-bromoanthraquinone-2-sulfonate with 1-(5-amino-2-methylbenzyl)-2-pyrrolidone.

DAVID I. RANDALL.
EDGAR E. RENFREW.

REFERENCES CITED

The following references are of record in the file of this patent:

UNITED STATES PATENTS

| Number | Name | Date |
|---|---|---|
| 2,506,025 | Jenny et al. | May 2, 1950 |

FOREIGN PATENTS

| Number | Country | Date |
|---|---|---|
| 171,956 | Germany | Dec. 1, 1934 |